(12) United States Patent
Kumar et al.

(10) Patent No.: US 10,435,499 B2
(45) Date of Patent: *Oct. 8, 2019

(54) SOLVENT-BORNE SYSTEM FOR FORMING AN N-ACYL UREA COATING

(71) Applicant: BASF SE, Ludwigshafen am Rhein (DE)

(72) Inventors: Rajesh Kumar, Riverview, MI (US); Hai Sheng Wu, Shanghai (CN); Nikolay Lebedinski, West Bloomfield, MI (US); Sunitha Grandhee, Novi, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/548,358

(22) PCT Filed: Feb. 1, 2016

(86) PCT No.: PCT/US2016/015962
§ 371 (c)(1),
(2) Date: Aug. 2, 2017

(87) PCT Pub. No.: WO2016/126606
PCT Pub. Date: Aug. 11, 2016

(65) Prior Publication Data
US 2018/0016377 A1    Jan. 18, 2018

Related U.S. Application Data

(60) Provisional application No. 62/111,169, filed on Feb. 3, 2015.

(51) Int. Cl.
| | | |
|---|---|---|
| *C08G 18/08* | (2006.01) |
| *C08G 18/09* | (2006.01) |
| *C08G 18/16* | (2006.01) |
| *C08G 18/28* | (2006.01) |
| *C08G 18/32* | (2006.01) |
| *C08G 18/34* | (2006.01) |
| *C08G 18/40* | (2006.01) |
| *C08G 18/42* | (2006.01) |
| *C08G 18/48* | (2006.01) |
| *C08G 18/62* | (2006.01) |
| *C08G 18/66* | (2006.01) |
| *C08G 18/72* | (2006.01) |
| *C08G 18/75* | (2006.01) |
| *C08G 18/76* | (2006.01) |
| *C08G 18/79* | (2006.01) |
| *C09D 7/20* | (2018.01) |

(Continued)

(52) U.S. Cl.
CPC ....... *C08G 18/095* (2013.01); *C08G 18/0852* (2013.01); *C08G 18/168* (2013.01); *C08G 18/2825* (2013.01); *C08G 18/3206* (2013.01); *C08G 18/348* (2013.01); *C08G 18/4018* (2013.01); *C08G 18/4277* (2013.01); *C08G 18/4283* (2013.01); *C08G 18/4829* (2013.01); *C08G 18/62* (2013.01); *C08G 18/6611* (2013.01); *C08G 18/6625* (2013.01); *C08G 18/6692* (2013.01); *C08G 18/725* (2013.01); *C08G 18/755* (2013.01); *C08G 18/7621* (2013.01); *C08G 18/7671* (2013.01); *C08G 18/792* (2013.01); *C08G 18/797* (2013.01); *C09D 7/20* (2018.01); *C09D 175/02* (2013.01); *C09D 175/04* (2013.01)

(58) Field of Classification Search
CPC .............. C08G 18/095; C08G 18/4829; C08G 18/6692; C08G 18/725; C08G 18/755; C08G 18/7621; C08G 18/7671; C08G 18/792; C08G 18/797; C08G 18/168; C08G 18/2825; C08G 18/3206; C08G 18/348; C08G 18/0852; C08G 18/4018; C08G 18/4277; C08G 18/4283; C08G 18/62; C08G 18/6611; C08G 18/6625; C09D 175/04; C09D 175/02; C09D 7/20
See application file for complete search history.

(56) References Cited

U.S. PATENT DOCUMENTS

| | | | |
|---|---|---|---|
| 3,056,835 A | 10/1962 | Monagle, Jr. et al. | |
| 3,152,131 A | 10/1964 | Heberling, Jr. | |
| 3,406,197 A | 10/1968 | Ulrich | |
| 3,406,198 A | 10/1968 | Budnick | |
| 3,522,303 A | 7/1970 | Ulrich | |
| 4,143,063 A | 3/1979 | Alberino et al. | |
| 5,574,083 A * | 11/1996 | Brown | C08G 18/025 252/182.23 |
| 2009/0171016 A1 * | 7/2009 | Sato | C08K 5/29 524/608 |
| 2018/0223111 A1 * | 8/2018 | Kumar | C09D 5/082 |

FOREIGN PATENT DOCUMENTS

| | | |
|---|---|---|
| EP | 0 628 582 A2 | 12/1994 |
| KR | 2004-0103041 A | 12/2004 |

OTHER PUBLICATIONS

International Search Report for Application No. PCT/US2016/015962 dated May 11, 2016, 3 pages.

(Continued)

*Primary Examiner* — Patrick D Niland
(74) *Attorney, Agent, or Firm* — DLA Piper LLP US

(57) ABSTRACT

This disclosure provides a solvent-borne system for forming an n-acyl urea coating on a substrate. In one embodiment, the solvent-borne system comprises a polycarbodiimide-polyurethane hybrid. The solvent-borne system also comprises an acid functional polymer and an organic solvent, and comprises less than or equal to 10 weight percent of water based on a total weight of said solvent-borne system. The solvent-borne system also comprises less than about 100 parts by weight of toluene diisocyanate per one million parts by weight of the solvent-borne system.

21 Claims, No Drawings

(51) Int. Cl.
*C09D 175/02* (2006.01)
*C09D 175/04* (2006.01)

(56) References Cited

OTHER PUBLICATIONS

Bell, Pat et al., "Use of Carbodiimides for Interior Clear Wood Floor Finishes", Sep. 2010, p. 32-40.
Chemical Abstracts Service, Database CA, "Lim, Byeong Seok: Process for Producing Water-Dispersible Acryl-Urethane Hybrid Resin Good in Coating Strength After Drying", XP002756638, Database Accession No. 2006:808013, Dec. 2004, 2 pages.
ASTM International, "Standard Test Method for Specular Gloss", Designation: D523-14, Jan. 27, 2015, 5 pages.
ASTM International, "Standard Test Method for Viscosity by Ford Viscosity Cup", Designation: D1200-10, Jan. 27, 2015, 4 pages.
ASTM International, "Standard Test Method for Effect of Household Chemicals on Clear and Pigmented Organic Finishes", Designation: D1308-02, Jan. 29, 2015, 2 Pages.
ASTM International, "Standard Test Methods for Drying, Curing, or Film Formation of Organic Coatings at Room Temperature", Designation: D1640-03, Jan. 27, 2015, 9 Pages.
ASTM International, "Standard Test Methods for Measuring Adhesion by Tape Test", Designation: D3359-08, 2008, pp. 1-7.
ASTM International, "Standard Test Method for Film Hardness by Pencil Test", Designation: D3363-05, Jan. 27, 2015, 3 pages.
ASTM International, "Standard Test Methods for Hardness of Organic Coatings by Pendulum Damping Tests", Designation: D4366-14, Jan. 27, 2015, 4 pages.
ASTM International, "Standard Test Method for Impact Flexibility of Organic Coatings", Designation: D6905-03, Jan. 29, 2015, 3 Pages.
English language abstract and machine-assisted English translation for KR 2004-0103041 extracted from espacenet.com database on Aug. 10, 2017, 15 pages.

* cited by examiner

SOLVENT-BORNE SYSTEM FOR FORMING AN N-ACYL UREA COATING

RELATED APPLICATIONS

The present application is the National Stage of International Patent Application No. PCT/US2016/015962, filed on Feb. 1, 2016, which claims priority to and all advantages of U.S. Provisional Patent Application No. 62/111,169, filed on Feb. 3, 2015, the disclosure of which is specifically incorporated by reference in its entirety.

FIELD OF THE DISCLOSURE

This disclosure generally relates to a solvent-borne system for forming an n-acyl urea coating on a substrate. More specifically, the solvent-borne system includes a polycarbodiimide-polyurethane hybrid, an acid functional polymer, and an organic solvent and has a low (residual) amount of toluene diisocyanate.

BACKGROUND

Carbodiimides are widely used condensation reagents in the areas of peptide and organic synthesis to convert carboxylic acids to other more useful groups such as amides and esters. A rapid reaction between carbodiimides and carboxylic acids also enables carbodiimides to serve as acid scavengers and hydrolysis stabilizers for ester based polymers. Carbodiimides have found many uses in industry. However, aromatic carbodiimides, in particular, have not found a suitable application in coatings. Therefore, there remains an opportunity for improvement and advancement.

SUMMARY OF THE DISCLOSURE

This disclosure provides a solvent-borne system for forming an n-acyl urea coating on a substrate. In one embodiment, the solvent-borne system includes a polycarbodiimide-polyurethane hybrid having the structure:

wherein each n is independently a number from 1 to 20, wherein Y is an alkoxy or polyalkoxy group having (w) oxygen atoms, wherein each w is independently at least 1, wherein each z is independently a number from 0 to (w−1); and wherein x, Y, and a total of the $C_nH_{2n+1}$ groups are present in a ratio of from (4 to 5):(0.5 to 1.5):(2.5 to 4.5), respectively. The solvent-borne system also includes an acid functional polymer and an organic solvent, and includes less than or equal to 10 weight percent of water based on a total weight of the solvent-borne system. The solvent-borne system also includes less than about 100 parts by weight of toluene diisocyanate per one million parts by weight of the solvent-borne system.

DETAILED DESCRIPTION OF THE DISCLOSURE

This disclosure provides a solvent-borne system (hereinafter described as the "system") for forming an n-acyl urea coating on a substrate. The terminology "solvent-borne" typically describes that the system includes less than or equal to 10, 9, 8, 7, 6, 5 4, 3, 2, 1, 0.5, or 0.1, weight percent of water based on a total weight of the system. In one embodiment, the system is entirely free of water. The system is typically utilized to form the n-acyl urea coating on the substrate. The n-acyl urea coating itself is not particularly limited and is described in greater detail below along with the substrate.

Solvent-Borne System:

The system includes a polycarbodiimide-polyurethane hybrid (hereinafter described as the "hybrid"). In one embodiment, the hybrid has the structure:

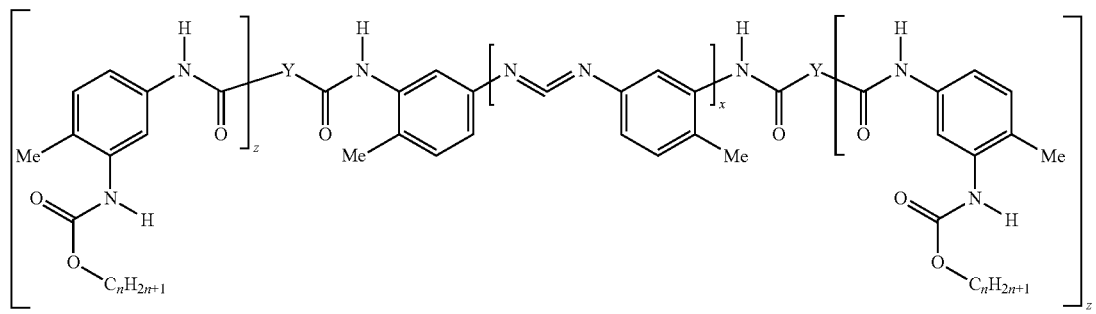

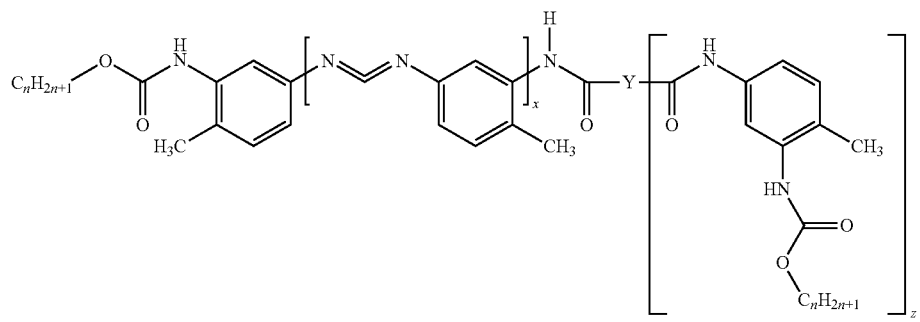

In another embodiment, the hybrid has the structure:

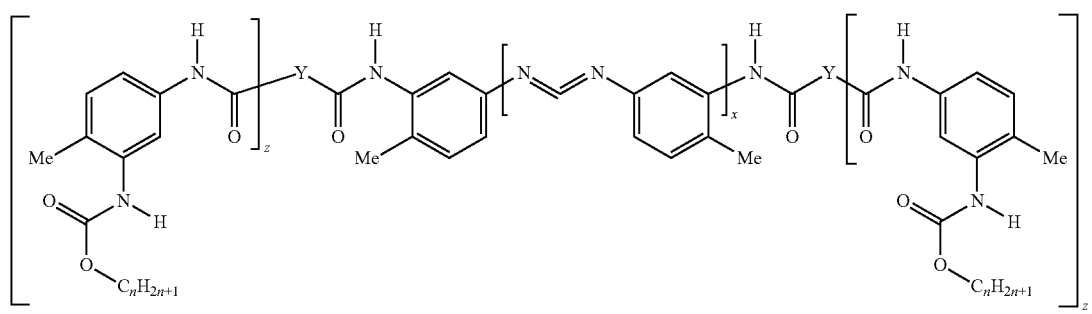

Yet, in another embodiment, the hybrid is further defined as a mixture of both of the immediately aforementioned structures wherein each is independently present in a weight ratio of from 0:100 to 100:0, respectively. In various non-limiting embodiments, all values and ranges of values between and including the aforementioned values are hereby expressly contemplated.

In a further embodiment, a blend of preformed polyurethane/polyurea and polycarbodiimide in 1:100 or 100:1 ratio (or any value or range of values therebetween) is present, either with or without the aforementioned hybrid. In such embodiments, the preformed polyurethane/polyurea and polycarbodiimide may be any described herein or any formed from any process or method step described herein. For example, the polyurethane/polyurea and/or polycarbodiimide may be formed using any one or more method steps described below. In one embodiment, the polyurethane/polyurea is formed and then segregated, e.g. such that any excess NCO groups do not react to form polycarbodiimides and such that the hybrid is not formed. In such a scenario, the polyurethane/polyurea can then be independently combined with an independently formed polycarbodiimide. Similarly, the polycarbodiimide may be formed and then segregated such that no polyurethane is formed and such that the hybrid is not formed. In such a scenario, the polycarbodiimide can then be independently combined with an independently formed polyurethane/polyurea. In these types of scenarios, the hybrid itself may not be present. Alternatively, the hybrid may be added to the independently formed polyurethane/polyurea and/or to the independently formed polycarbodiimide such that the hybrid would then be present in the mixture after the independently formed polyurethane/polyurea is combined with the independently formed polycarbodiimide.

In these structures, each n is independently a number from 1 to 20, e.g. 1, 2, 3, 4, 5, 6, 7, 8, 9, 10, 11, 12, 13, 14, 15, 16, 17, 18, 19, or 20, or any range thereof. In various embodiments, n is determined based on a monol, diol, triol, or polyol used to form urethane linkages (NCO linkages) in the aforementioned structure. In various non-limiting embodiments, all values and ranges of values between and including the aforementioned values are hereby expressly contemplated.

Also in this structure, each Y is independently an alkoxy or polyalkoxy group having (w) oxygen atoms, wherein each w is independently at least 1. In various embodiments, each w is independently 1, 2, or 3. However, it is contemplated that each w may independently be greater than 3, e.g. 4, 5, 6, 7, or 8. The terminology "alkoxy" typically describes a group having an alkyl moiety singly bonded to an oxygen atom, which in turn is typically bonded to a hydrogen atom, e.g. alkyl-O—H. The terminology "polyalkoxy" group typically describes two or more alkoxy groups bonded together. One or more Y may be bonded to (or capped with) a hydrogen atom, e.g. if z=0. In various non-limiting embodiments, all values and ranges of values between and including the aforementioned values are hereby expressly contemplated.

In alternative embodiments, each Y is independently derived from a tri-hydroxy functional polyol having a hydroxyl number from 1500 to 2000, from 1550 to 1950, from 1600 to 1900, from 1650 to 1850, from 1700 to 1800, from 1700 to 1750, or from 1750 to 1800, mg KOH/g. In various embodiments, each Y is independently derived from a tri-hydroxy functional polyol having a hydroxyl number from 800 to 1200, 850 to 1150, 900 to 1100, 950 to 1050, 950 to 1000, or 1000 to 1050, mg KOH/g. In other embodiments, each Y is independently derived from a tri-hydroxy functional polyol having a hydroxyl number from 200 to 400, from 250 to 350, from 250 to 300, or from 300 to 350, mg KOH/g. In other embodiments, each Y is independently derived from a tri-hydroxy functional polyol having a hydroxyl number from 20 to 400, from 30 to 390, from 40 to 380, from 50 to 370, from 60 to 360, from 70 to 350, from 80 to 340, from 90 to 330, from 100 to 320, from 110 to 310, from 120 to 300, from 130 to 290, from 140 to 280, from 150 to 270, from 160 to 260, from 170 to 250, from 180 to 240, from 190 to 230, from 200 to 220, from 200 to 210, or from 210 to 220, mg KOH/g. In other embodiments, each Y is independently derived from glycerine. In further embodiments, each Y is independently derived from propylene glycol, ethylene glycol, butylene glycol, copolymers thereof, and combinations thereof. Alternatively, each Y may be independently derived from a diol. Further, each Y may be independently derived from a monol, e.g. 1-decanol, 2-propyl-1-heptanol, or 2-ethyl-hexanol, or a combination thereof. Other, lower carbon number monols may also be used such as n-butanol, pentanol, or any alcohols having 4, 5, 6, 7, 8, 9, 10, 11, or 12, carbon atoms. Alternatively, each Y may be described as being independently derived from a polyester polymer. The monols, diols, and polyols used may be chosen from those set forth in the instant Examples below, e.g. glycerine, Pluracol 858, Pluracol GP 430, and Pluracol GP 730, and combinations thereof. In further embodiments, each Y may be described as being independently derived from a polyol that is 4, 5, 6, 7, or 8, hydroxy-functional or a combination thereof. In still other embodiments, each Y may independently be any described above. For example, if the hybrid has two Y groups, then they may be the same or different from each other. In one embodiment, Y is or is derived from trimethylolpropane. It is also contemplated that any isomer of any of the aforementioned compounds may also be used. In various non-limiting embodiments, all values and ranges of values between and including the aforementioned values are hereby expressly contemplated.

Moreover in these structures, z is a number from 0 to (w−1), e.g., 0, 1 or 2. Additionally, x, Y, and a total of the $C_nH_{2n+1}$ groups are present in a ratio of from (4 to 5):(0.5 to 1.5):(2.5 to 4.5), respectively. In various embodiments, the first value of from (4 to 5) may be further defined as from 4.1 to 4.9, from 4.2 to 4.8, from 4.3 to 4.7, from 4.4 to 4.6, from 4.4 to 4.5, or from 4.5 to 4.6, or any other range thereof. In other embodiments, the second value of from (0.5 to 1.5) may be further defined as 0.6 to 1.4, 0.7 to 1.3, 0.8 to 1.2, 0.9 to 1.1, 0.9 to 1, or 1 to 1.1, or any other range thereof. In further embodiments, the third value of from (2.5 to 4.5) may be further defined as 2.6 to 4.4, 2.7 to 4.3, 2.8 to 4.2, 2.9 to 4.1, 3 to 4, 3.1 to 3.9, 3.2 to 3.8, 3.3 to 3.7, 3.4 to 3.6, 3.4 to 3.5, or 3.5 to 3.6. In various non-limiting embodiments, all values and ranges of values between and including the aforementioned values are hereby expressly contemplated.

In one embodiment, w is 3 and z is 2. For example, the hybrid may have the structure:

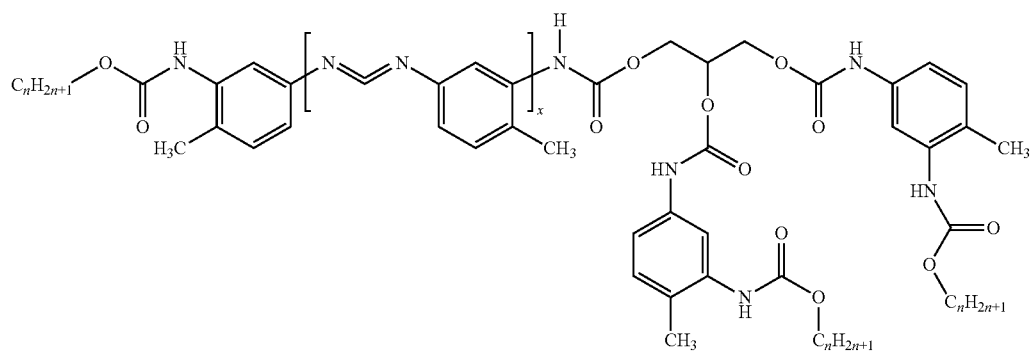

Alternatively, the hybrid may have the structure:

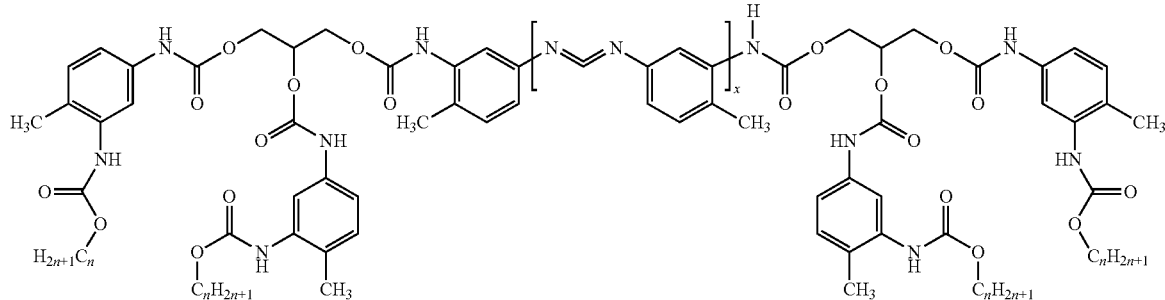

However, it is contemplated that even when w is 3 and z is 2, the hybrid may have a different structure than what is set forth above, e.g. depending on Y.

In other embodiments, w is 2 and z is 1. For example, the hybrid may have the structure:

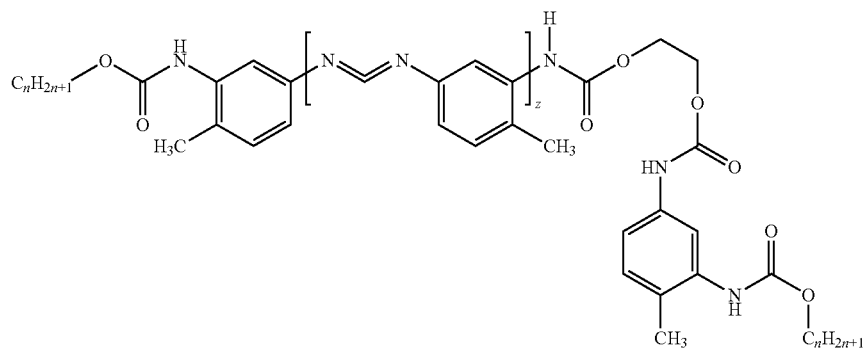

Alternatively, the hybrid may have the structure:

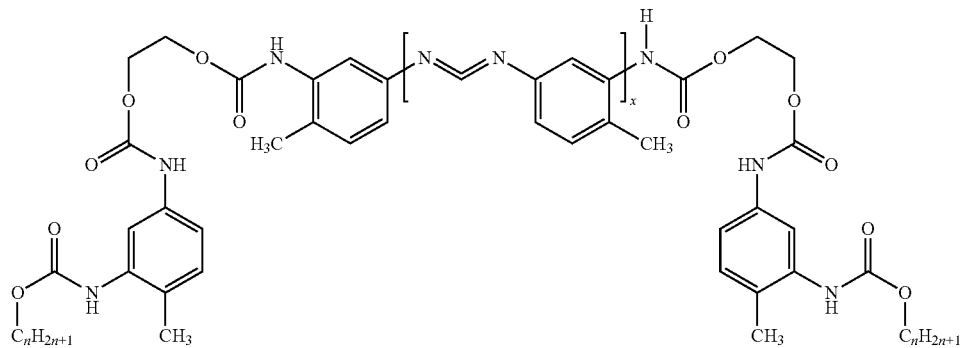

However, it is contemplated that even when w is 2 and z is 1, the hybrid may have a different structure than what is set forth above, e.g. depending on Y.

In further embodiments, w is 1 and z is 0. For example, the hybrid may have the structure:

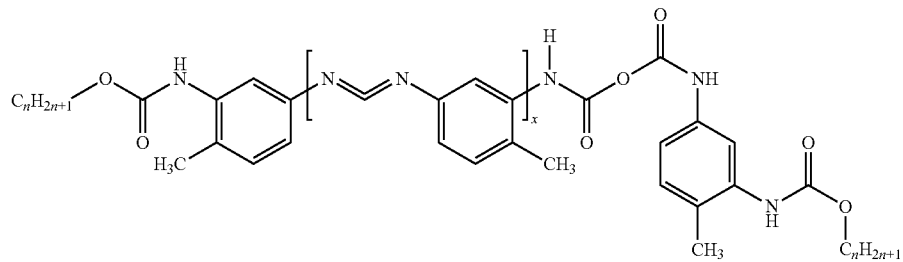

Alternatively, the hybrid may have the structure:

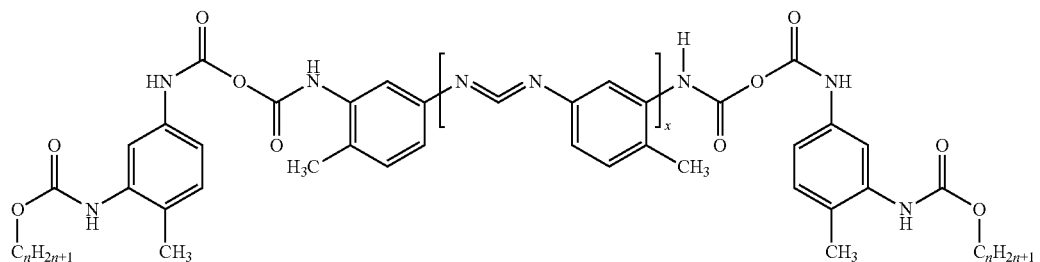

However, it is contemplated that even when w is 1 and z is 0, the hybrid may have a different structure than what is set forth above, e.g. depending on Y.

In still other embodiments, the hybrid may be defined as the reaction product of a polycarbodiimide and a monol, diol, triol, or polyol. For example, an isocyanate, e.g. toluene diisocyanate or any isomers thereof, may be used to form the hybrid. It may be reacted (with itself) in the presence an appropriate catalyst known in the art, using heating (e.g. at 110 C.) until an NCO content drops, e.g. to 8 to 15%, 10 to 12%, etc. At this stage, solvent can be added. This typically forms a polycarbodiimide. At that point, the monol, diol, triol, or polyol, or a combination of any one or more, can be added in any order and reacted with the polycarbodiimide to form the hybrid. Alternatively, an isocyanate (such as TDI or any isomers thereof) and a polyol can be reacted to form a polyurethane that has an excess of NCO groups. At that point, a catalyst, such as the one described above or any known to be suitable in the art, may be added such that the NCO groups react together thereby forming a polycarbodiimide linkage and forming the hybrid. At any one of these points, the process may be stopped such that a polyurethane/polyurea and/or polycarbodiimide may be segregated, e.g. as described in various embodiments above. In such embodiments, the independently formed polyurethane/polyurea and polycarbodiimide can be later combined.

The carbodiimidization catalyst may be any type of carbodiimization catalyst known to those skilled in the art for producing a polycarbodiimide. Generally, the carbodiimidization catalyst is selected from the group of tertiary amides, basic metal compounds, carboxylic acid metal salts and/or non-basic organo-metallic compounds. In certain embodiments, the carbodiimidization catalyst comprises a phosphorus compound.

Specific examples of phosphorus compounds suitable for the purposes of the carbodiimidization catalyst include, but are not limited to, phospholene oxides such as 3-methyl-1-phenyl-2-phospholene oxide, 1-phenyl-2-phospholen-1-oxide, 3-methy-1-2-phospholen-1-oxide, 1-ethyl-2-phospholen-1-oxide, 3-methyl-1-phenyl-2-phospholen-1oxide, and 3-phospholene isomers thereof. A particularly suitable phospholene oxide is 3-methyl-1-phenyl-2-phospholene oxide.

Additional examples of phosphorous compounds suitable for the purposes of the carbodiimidization catalyst include, but are not limited to, phosphates, diaza- and oxaza phospholenes and phosphorinanes. Specific examples of such phosphorous compounds include, but are not limited to, phosphate esters and other phosphates such as trimethyl phosphate, triethyl phosphate, tributyl phosphate, tri-2-ethylhexyl phosphate, tributoxyethyl phosphate, trioleyl phosphate, triphenyl phosphate, tricresyl phosphate, trixylenyl phosphate, cresyl diphenyl phosphate, xylenyl diphenyl phosphate, 2-ethylhexyldiphenyl phosphate, and the like; acidic phosphates such as methyl acid phosphate, ethyl acid phosphate, isopropyl acid phosphate, butyl acid phosphate, 2-ethylhexyl acid phosphate, isodecyl acid phosphate, lauryl acid phosphate, isotridecylacid phosphate, myristyl acid phosphate, isostearyl acid phosphate, oleyl acid phosphate, and the like; tertiary phosphites such as triphenyl phosphite, tri(p-cresyl) phosphite, tris(nonylphenyl) phosphite, triisooctyl phosphite, diphenyisodecyl phosphite, phenyldiisodecyl phosphite, triisodecyl phosphite, tristearyl phosphite, trioleyl phosphite, and the like; secondary phosphites such as di-2-ethylhexyl hydrogen phosphite, dilauryl hydrogen phosphite, dioleyl hydrogen phosphite, and the like; and phosphine oxides, such as triethylphosphine oxide, tributylphosphine oxide, triphenylphosphine oxide, tris(chloromethyl)phosphine oxide, tris(chloromethyl)phosphine oxide, and the like. Carbodiimidization catalysts comprising phosphate esters and methods for their preparation are described in U.S. Pat. No. 3,056,835, which is hereby incorporated by reference in its entirety, in various non-limiting embodiments.

Yet further examples the carbodiimidization catalyst include, but are not limited to, 1-phenyl-3-methyl phospholene oxide, 1-benzyl-3-methyl phospholene oxide, 1-ethyl-3-methyl phospholene oxide, 1-phenyl-3-methyl phospholene dichloride, 1-benzyl-3-methyl phospholene dichloride, 1-ethyl-3-methyl phospholene dichloride, 1-phenyl-3-methyl phospholene sulphide, 1-phenyl-3-methyl phospholene sulphide, 1-benzyl-3-methyl phospholene sulphide, 1-ethyl-3-methyl phospholene sulphide, 1-phenyl-1-phenylimino-3-methyl phospholene oxide, 1-benzyl-1-phenylimino-3-methyl phospholene oxide 1-ethyl-1-phenylimino-3-methyl phospholene oxide, 1-phenyl phospholidine, 1-benzyl phospholidine, 1-ethyl phospholidine, and 1-phenyl-3-methyl phospholene oxide.

The carbodiimidization catalyst may alternatively comprise diaza- and oxazaphospholenes and phosphorinanes. Diaza- and oxaza-phospholenes and phosphorinanes and methods for their preparation are described in U.S. Pat. No. 3,522,303, which is hereby incorporated by reference in its entirety in various non-limiting embodiments. Specific diaza- and oxaza-phospholenes and phosphorinanes include, but are not limited to, 2-ethyl-1,3-dimethyl-1,3,2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2-oxide; 2-phenyl-1,3-di methyl-1,3,2-diazaphospholane-2-oxide; 2-phenyl-1,3-dimethyl-1,3,2-diazaphosphorinane-2-oxide; 2-benzyl-1,3-dimethyl-1,3,2-diazaphospholane-2-oxide; 2-allyl-1,3-di methyl-1,3 , 2-diazaphospholane-2-oxide; 2-bromomethyl-1,3-dimethyl-1,3,2-diazaphospholane-2-oxide; 2-cyclohexyl-1,3-dimethyl-1,3,2-diazaphospholane-2-oxide; 2-cyclohexyl-1,3-dimethyl-1,3,2-diaphospholane-2-oxide; 2-(2-ethoxy ethyl 1,3-dimethyl-1,3,2-diazaphospholane-2-oxide; and 2-naphthyl-1,3-dimethyl-1,3,2-diazaphospholane-2-oxide, triethyl phosphate, hexamethyl phosphoramide, and the like.

The carbodiimidization catalyst may comprise a triaryl arsine. Triaryl arsines and methods for their preparation are described in U.S. Pat. No. 3,406,198, which is hereby incorporated by reference in its entirety in various non-limiting embodiments. Specific examples of triaryl arsines include, but are not limited to, triphenylarsine, tris(p-tolyl) arsine, tris(pmethoxyphenyl) arsine, tris(p-ethoxyphenyl) arsine, tris(p-chlorophenyl)arsine, tris(pfluorophenyl) arsine, tris(2,5-xylyl)arsine, tris(p-cyanophenyl)arsine, tris (naphthyl)arsine, tris(p-methylmercaptophenyl)arsine, tris (p-biphenylyl)arsine, pchlorophenyl bis(p-tolyl)arsine, phenyl(p-chlorophenyl)(p-bromophenyl)arsine, and the like. Additional arsine compounds are described in U.S. Pat. No. 4,143,063, which is hereby incorporated by reference in its entirety, in various non-limiting embodiments. Specific examples of such arsine compounds include, but are not limited to, triphenylarsine oxide, triethylarsine oxide, polymer bound arsine oxide, and the like. Further, the carbodiimidization catalyst may comprise metallic derivatives of acetlyacetone. Metallic derivatives of acetylacetone and methods are described in U.S. Pat. No. 3,152,131, which is hereby incorporated by reference in its entirety in various non-limiting embodiments. Specific examples of metallic derivatives of acetylacetone include, but are not limited to, metallic derivatives of acetylacetone such as the beryllium, aluminum, zirconium, chromium, and iron derivatives. Additional examples of the carbodiimidization catalyst include metal complexes derived from a d-group transition element and π-bonding ligand selected from the group consisting of carbon monoxide, nitric oxide, hydrocarbylisocyanides, trihydrocarbylphosphine, trihydrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such metal complexes and methods for preparation are described in U.S. Pat. No. 3,406,197, which is hereby incorporated by reference in its entirety in various non-limiting embodiments. Specific examples of metal complexes include, but are not limited to, iron pentacarbonyl, di-iron pentacarbonyl, tungsten hexacarbonyl, molybdenum hexacarbonyl, chromium hexacarbonyl, dimanganese decacarbonyl, nickel tetracarbonyl, ruthenium pentacarbonyl, the complex of iron tetracarbonyl:methylisocyanide, and the like.

The carbodiimidization catalyst may comprise organotin compounds. Specific examples of organotin compounds include, but are not limited to, dibutyltin dilaurate, dibutyltin diacetate, dibutyltin di(2-ethylhexanoate), dioctyltin dilaurate, dibutyltin maleate, di(n-octyl)tin maleate, bis(dibutylacetoxytin) oxide, bis(dibutyllauroyloxytin) oxide, dibutyltin dibutoxide, dibutyltin dimethoxide, dibutyltin disalicilate, dibutyltin bis(isooctylmaleate), dibutyltin bis(isopropylmaleate), dibutyltin oxide, tributyltin acetate, tributyltin isopropyl succinate, tributyltin linoleate, tributyltin nicotinate, dimethyltin dilaurate, dimethyltin oxide, dioctyltin oxide, bis(tributyltin) oxide, diphenyltin oxide, triphenyltin acetate, tri-n-propyltin acetate, tri-n-propyltin laurate and bis(tri-n-propyltin) oxide, dibutyltin dilauryl mercaptide, dibutyltin bis(isooctylmercaptoacetate), bis(triphenyltin)oxide, stannous oxalate, stannous oleate, stannous naphthenate, stannous acetate, stannous butyrate, stannous 2-ethylhexanoate, stannous laurate, stannous palmitate, stannous stearate, and the like. Typical organotin compounds include, but are not limited to, stannous oxalate, stannous oleate and stannous 2-ethylhexanoate, dibutyltin diacetate, dibutyltin dilaurate, dibutyltin dilaurylmercaptide, dibutyltin bis(isooctylmercaptoacetate), dibutyltin oxide, bis (triphenyltin) oxide, and bis(tri-n-butyltin) oxide. Further, the carbodiimidization catalyst may comprise various organic and metal carbene complexes, titanium(IV) complexes, copper(I) and/or copper(II) complexes.

The hybrid is typically present in an amount of from 5 to 80, 10 to 75, 15 to 70, 20 to 65, 25 to 60, 30 to 55, 35 to 50, 40 to 45, or 45 to 50, parts by weight per 100 parts by weight of the system. In additional non-limiting embodiments, all values and ranges of values between the aforementioned values are hereby expressly contemplated.

Acid Functional Polymer:

The system also includes an acid functional polymer. Typically, the acid functional polymer reacts with the hybrid to form the n-acyl urea coating. The acid functional polymer is also not particularly limited and may be any polymer that includes one or more acidic groups, such as —H groups, carboxylic acid groups, carbonic acid groups, sulfonic, thiol, phenols, phosphoric, and sulfinic acid groups, and the like. In various embodiments, the acid functional polymer is chosen from organic mono, di, and/or poly-acids, polyacrylic acids, acid functional polyurethanes, acid functional polyesters, thiols, phenols, phosphoric functional and combinations thereof. The acid functional polymer is not particularly limited in an amount in the system. However, the acid functional polymer is typically present in an amount of from 5 to 80, 10 to 75, 15 to 70, 20 to 65, 25 to 60, 30 to 55, 35 to 50, 40 to 45, or 45 to 50, parts by weight per 100 parts by weight of the system. In additional non-limiting embodiments, all values and ranges of values between the aforementioned values are hereby expressly contemplated.

Organic Mono, Di-, and/or Poly- Acid:

In one embodiment, the acid functional polymer is further defined as an organic mono, di, and/or poly-acid. The organic mono, di, and/or poly-acid is not particularly limited and may be any known in the art. For example, the organic mono, di, and/or poly-acid may have the formula HO(O)CR[C(O)OH]$_m$ wherein R is an alkyl group having from 1 to 36, e.g. from 1 to 20, carbon atoms and m is from 0 to 3. In various non-limiting embodiments, it is contemplated that for each of the aforementioned ranges, each value may independently be any value or range of values therebetween. In one embodiment, the organic mono, di, and/or poly-acid is a polymer of a dimer acid. The organic mono, di, and/or poly-acid is not particularly limited in an amount in the system. In various embodiments, the following commercial products may be utilized as the organic mono, di, and/or poly-acid: Empol® 1003, -1016, -1026, -1028, -1061, -1062, -1043, -1008, -1012, and/or Pripol® 1006, 1009, 1012, 1013, 1017, 1022, 1025, 1027, or combinations thereof. Additional commercially available suitable products include dimers acids such as LS-17, and HY-001, -002, -003, -004, and -005, and combinations thereof, that are commercially available from Anqing Hongyu Chemical Co., Ltd. or Jiujiang Lishan Entech Co., Ltd.

Polyacrylic Acid:

In another embodiment, the acid functional polymer is further defined as a polyacrylic acid. The polyacrylic acid is not particularly limited and may be any known in the art. In various embodiments, the polyacrylic acid is further defined as a modified acrylic copolymer or styrene acrylic resin. Alternatively, the polyacrylic acid may be described as an acid functional copolymer of styrene and/or alpha-methylstyrene and an acrylate or methacrylate and/or 2-ethylhexylacrylate. In various embodiments, the following commercial products may be utilized as the polyacrylic acid: Joncryl® 611, 682, or combinations thereof.

Acid Functional Polyurethane:

In still other embodiments, the acid functional polymer is further defined as an acid functional polyurethane. The acid functional polyurethane is not particularly limited and may be any polyurethane that includes an acidic group. The acid functional polyurethane may have the formula OCNR'NHCOOCH$_2$C(CH$_3$)(COOH)CH$_2$OCONHR'NCO, wherein R' is a TDI, MDI, HDI, IPDI, NDI, or TMXDI residue. Alternatively, the acid functional polyurethane may be a prepolymer of TDI, MDI, HDI, IPDI, NDI, or TMXDI. Any of these isocyanate residues or prepolymers may be formed using the isocyanates or isomers thereof or blends thereof. The aforementioned acronyms are understood by those of skill in the art.

Acid Functional Polyester:

In further embodiments, the acid functional polymer is further defined as an acid functional polyester. In various embodiments, the acid functional polyester is chosen from (1) a polymer of styrene, maleic anhydride, and an alcohol, (2) a polymer of caprolactone and dimethylolpropionic acid, and combinations thereof. In other embodiments, the acid functional polyester is further defined as linear. In another embodiment, the acid functional polyester may be further defined as a styrene-maleic anhydride ester or styrene maleic anhydride copolymer. In various embodiments, the following commercial products may be utilized as the acid functional polyester: SMA 1440, -2625, -3840, -17352, DICAP 2020, DMPA® Polyol HA-0135, DMPA® Polyol HA-0135LV2, or combinations thereof.

Organic Solvent:

The system also includes an organic solvent. The organic solvent is not particularly limited and may be any of the art. For example the organic solvent may be polar or non-polar. In various embodiments, the organic solvent is chosen from dimethoxyether, tetrahydrofuran, butylacetate, xylene, methyl ethyl ketone, methyoxypropylacetate, acetone, and combinations thereof. In other embodiments, the organic solvent is chosen from alcohols, dimethoxyether, tetrahydrofuran, butylacetate, aliphatic- and aromatic hydrocarbons, methyl ethyl ketone, methyoxypropylacetate, 1-chloro-4 (trifluoromethyl)benzene, acetone, and combinations thereof. In other embodiments, the organic solvent is chosen from alcohols, ethers, ketones, acetates, and combinations thereof. In further embodiments, the organic solvent is chosen from alcohols, glycols, halogenated and/or non-halogenated aliphatic- and aromatic hydrocarbons, esters, ketones, ethers and combinations thereof.

As first described above, the system is solvent-borne and includes less than or equal to 10, 9, 8, 7, 6, 5, 4, 3, 2, or 1, weight percent of water based on a total weight of the solvent-borne system. In other words, typically the organic solvent is used almost exclusively in place of water. However, some residual water may be present, e.g. up to about 10 weight percent. The organic solvent itself is typically present in the system an amount of from 1 to 99, 5 to 95, 10 to 95, 10 to 50, 15 to 90, 20 to 85, 25 to 80, 30 to 75, 35 to 70, 40 to 65, 45 to 60, 50 to 55, or 55 to 60, parts by weight per 100 parts by weight of the system. In other words, the system typically has a solids content of (100 minus the weight percent of the organic solvent). In additional non-limiting embodiments, all values and ranges of values between the aforementioned values are hereby expressly contemplated.

Properties of the System:

The system is not limited to any particular physical or chemical properties. In various embodiments, the system may have one or more of the properties described below or may have different properties altogether.

In various embodiments, the system has a pot life of at least or up to 2, 3, 4, 6, 8, 10, 12, 14, 16, 18, 20, 22, or 24 hours. In other embodiments, the system has a pot life of 4 to 6, 4 to 8, 6 to 8, 4 to 10, 4 to 12, 6 to 10, 6 to 12, 2 to 4, or 6 to 8, hours, or any number or range of hours between the aforementioned number of hours and up to 24 hours. In still other embodiments, the system has a pot life of from 0.5 to 12 hours, from 1 to 12, 2 to 11, 3 to 10, 4 to 9, 5 to 8, or 6 to 7, hrs, or any values or range of values therebetween including the endpoints. Increased pot-life tends to allow for better control over, and customization of, properties of the system and the eventual film/coating. Moreover, increased pot-life tends to increase production efficiencies, increase flexibility, and reduce manufacturing times. Pot-Life is typically determined using BYK-Gardner DIN 4 mm viscosity cups conform to the flow characteristics specified by Deutsche Normen DIN 53211. ASTM D1200 can also be used. In various non-limiting embodiments, all values and ranges of values between and including the aforementioned values are hereby expressly contemplated.

In other embodiments, the system has a viscosity of from 40 cps to 4,000 mPa·s, from 10 cps to 4,000 mPa·s, from 500 cps to 4,000 mPa·s, or from 1000 cps to 4000 mPa·s as determined using ASTM D5146-10. Viscosity can contribute to ease of application of the system onto a substrate and can increase control and optimization of performance of the system and the film/coating. In additional non-limiting embodiments, all values and ranges of values between the aforementioned values are hereby expressly contemplated.

Method of Forming the System:

This disclosure also provides a method of forming the solvent-borne system. The method includes the steps of providing the polycarbodiimide-polyurethane hybrid, providing the acid functional polymer, and providing the organic solvent. Each step of providing may independently be described as supplying or otherwise making each of these components available for formation of the system. Each component may be provided independently or with one or more other components. In one embodiment, the method does not form the hybrid itself but instead includes the step of independently forming a polyurethane/polyurea and/or independently forming a polycarbodiimide.

The method also includes the step of combining the hybrid, the acid functional polymer, and the organic solvent to form the solvent-borne system. Typically, the acid functional polymer and any other additives are added to a reactor followed by addition of the organic solvent. This mixture is solubilized via mechanical mixing. Subsequently, the hybrid is added to the mixture which is further mechanically mixed. The order may be reversed, i.e., the hybrid may be added to the reactor followed by the organic solvent. The mixture may then be homogenized by mixing. In such an embodiment, the acid functional polymer is then added and additional mixing is utilized to form a homogeneous solution. In alternative embodiments, the method does not include the step of combining the hybrid. Instead, in such embodiments, the method includes the step of combining the independently formed polyurethane/polyurea and the independently formed polycarbodiimide, the acid functional polymer, and the organic solvent to form the solvent-based system.

The solvent-borne system also includes less than about 100 parts by weight of (residual) toluene diisocyanate per one million parts by weight of the solvent-borne system. In various embodiments, the system includes less than 95, 90, 85, 80, 75, 70, 65, 60, 55, 50, 45, 40, 35, 30, 25, 20, 15, 10, or 5, parts by weight of (residual) toluene diisocyanate per one million parts by weight of the solvent-borne system. Similarly, the coating itself and/or the hybrid itself, or the composition described below, may independently include less than 95, 90, 85, 80, 75, 70, 65, 60, 55, 50, 45, 40, 35, 30, 25, 20, 15, 10, or 5, parts by weight of (residual) toluene diisocyanate per one million parts by weight of the coating or hybrid or composition, respectively. In further embodiments, the system, coating, hybrid, and/or composition may include even less of the residual toluene diisocyanate, e.g. less than 95, 90, 85, 80, 75, 70, 65, 60, 55, 50, 45, 40, 35, 30, 25, 20, 15, 10, 5, 4, 3, 2, 1, 0.5, 0.1, 0.05, or 0.01, parts by weight of (residual) toluene diisocyanate per one million parts by weight of the system, coating, hybrid, or composition, respectively, depending on, e.g. dilution with the solvent and/or evaporation of the toluene diisocyanate. In still other embodiments, the amount of (residual) toluene diisocyanate may be so low so as to be undetectable (which may be zero or slightly above zero, as would be understood by those of skill in the art). The terminology "residual" typically describes an amount of toluene diisocyanate left over/remaining from the original synthesis used to form the hybrid. In various non-limiting embodiments, all values and ranges of values between and including the aforementioned values are hereby expressly contemplated.

Composition:

This disclosure also provides a composition that includes the hybrid and the organic solvent. The composition typically results from the formation of the hybrid itself, e.g. by any of the methods or reactions described above. The composition may be combined with the acid functional polymer to form the system. In alternative embodiments, the composition does not include the hybrid itself and instead includes the aforementioned independently formed polyurethane/polyurea and/or the independently formed polycarbodiimide.

N-Acyl Urea Film/Coating:

This disclosure also provides the n-acyl urea film/coating itself. In the absence of the substrate, the coating can be described independently as a film. Accordingly, in various embodiments, the terminology "film" and "coating" may be interchangeable as set forth below.

The film is an n-acyl urea film, as is understood in the art. The film/coating includes or is the reaction product of the hybrid and the acid functional polymer. The hybrid and the acid functional polymer react in the presence of the organic solvent. Reaction speed may be controlled by catalyzing the reaction by using Lewis bases and/or by manipulating thermal energy of the system. The reaction may proceed as shown below or in a variant thereof as would be understood by one of skill in the art.

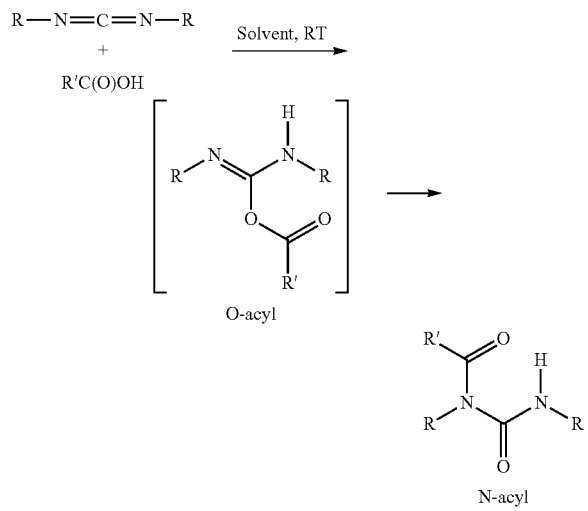

It is also contemplated that the film may be alternatively described as including n-acyl urea compounds/moieties but also including other compounds/moieties, e.g. those that may be formed if a stoichiometric excess of the hybrid is utilized, if a stoichiometric excess of the acid functional polymer is utilized, if a stoichiometric excess of the independently formed polyurethane/polyurea is utilized, or if a stoichiometric excess of the independently formed polycarbodiimide is utilized.

The film/coating is not particularly limited to any size, shape, or thickness and may be formed to specifications as determined by one of skill in the art. In various embodiments, the film/coating has a thickness of from 25 to 200, from 50 to 175, from 75 to 150, from 100 to 125, or from 125 to 150, microns, or any value or range of values therebetween. In other embodiments, the film/coating has a gloss of 90 to 100 measured at a 60 degree angle. Gloss (+/−2) % can be measured from an angle of 60 degrees using a BYK Gardner Multigloss meter in accordance with either ASTM D2457 or ASTM D523. In further embodiments, the film/coating has a pendulum hardness of from 70-95 as determined using a 100 μm wet film on glass, at 23±2 C, and at 56±5% relative humidity, using ASTM D4366. In still other embodiments, the film/coating has a pencil hardness of F—H using a 100 μm wet film on glass, at 23±2 C, and at 56±5% relative humidity, using ASTM D-3363-05. Moreover, the film/coating may have a chemical resistance of MEK double rubs above 100 or 200, as determined using ASTM D5402 or A7835. In various non-limiting embodiments, all values and ranges of values between the aforementioned values are hereby expressly contemplated.

In various embodiments, the progress of the reaction can be monitored by the decreased intensity of —N=C=N— vibration at 2100 cm$^{-1}$ with time. If the solvent-borne system utilizes n-butyl acetate solvent, the formation of n-acyl urea vibration can be difficult to monitor as it absorbs very close to the ester band of the solvent. However, upon utilizing solvents not absorbing in the region or in neat system (i.e. without a solvent), a strong vibration ~1700 cm$^{-1}$ assignable to n-acyl urea may be observed.

Method of Forming the N-Acyl Urea Film/Coating:

This disclosure also provides a method of forming the n-acyl urea film/coating. The method includes the steps of providing the polycarbodiimide-polyurethane hybrid, providing the acid functional polymer, providing the organic solvent, combining (in any order) the polycarbodiimide-polyurethane hybrid, the acid functional polymer, and the organic solvent to form the solvent-borne system, and reacting the polycarbodiimide-polyurethane hybrid and the acid functional polymer in the presence of the organic solvent to form the n-acyl urea film. Each step of providing may independently be described as supplying or otherwise making each of these components available for formation of the system. Each component may be provided independently or with one or more other components. In other embodiments, the method does not include the step of providing the hybrid and instead includes the step of providing the independently formed polyurethane/polyurea and providing the independently formed polycarbodiimide.

Article:

This disclosure also provides an article including a substrate and the n-acyl urea film/coating disposed on the substrate, e.g. by spraying, pouring, brushing, coating, etc. The n-acyl urea film/coating may be disposed on and in direct contact with the substrate or on and spaced apart from the substrate. For example, the n-acyl urea film/coating may be disposed on the substrate such that there is no layer in between the n-acyl urea film/coating and the substrate. Alternatively, the n-acyl urea film/coating may be disposed "on" the substrate and yet there may be an intermediate layer disposed between the n-acyl urea film/coating and the substrate. In this non-limiting embodiment, the n-acyl urea film/coating may still be described as being "disposed on" the substrate. The substrate is not particularly limited and may be any known in the art such as wood, metal, plastic, glass, a polymer, etc. In various embodiments, the article is further defined as furniture, wood flooring, wood trim, joinery (e.g. the wooden components of a building, such as stairs, doors, and door and window frames, viewed collectively), etc.

EXAMPLES

A series of polycarbodiimide-polyurethane hybrids (Hybrids 1-14) are formed according to this disclosure as set forth in Table 1 below. These hybrids are formed by reacting toluene diisocyanate (i.e., a mixture of the 2,4- and 2,6- isomers of toluene diisocyanate in a weight ratio of 80% to 20%) and various polyols. Various hybrids are then analyzed to determine a residual amount of TDI monomer.

TABLE 1

| Hyb. | Iso Wt. % | Polyol 1 | Wt. % | Polyol 2 | Wt. % | TPP Wt. % | Inert 2 Wt. % | MPPO Wt. % | Total | Res. TDI Wt % |
|---|---|---|---|---|---|---|---|---|---|---|
| 1 | 48.08 | GP 430 | 2.89 | 2-PH | 24.76 | 0.14 | 24.04 | 0.1 | 100.01 | 0.004 (40 ppm) |
| 2 | 47.93 | GP 430 | 2.88 | 1-Dec | 24.99 | 0.14 | 23.96 | 0.1 | 100.00 | 0.016 (160 ppm) |
| 3 | 47.20 | GP 430 | 2.83 | 2-PH | 26.14 | 0.14 | 23.60 | 0.1 | 100.01 | 0.006 (60 ppm) |
| 4 | 42.73 | GP 430 | 2.56 | 2-PH | 33.14 | 0.13 | 21.36 | 0.08 | 100.00 | 0.009 (90 ppm) |
| 5 | 48.56 | GP 730 | 2.91 | 2-PH | 24.28 | 0.15 | 26.01 | 0.1 | 102.01 | 0.007 (70 ppm) |
| 6 | 52.33 | Gly | 2.09 | 2-PH | 19.21 | 0.1 | 26.17 | 0.1 | 100.00 | — |
| 7 | 48.77 | P858 | 2.91 | 2-PH | 23.68 | 0.15 | 24.39 | 0.1 | 100.00 | — |
| 8 | 47.07 | GP 730 | 5.65 | 2-PH | 23.52 | 0.09 | 23.53 | 0.14 | 100.00 | — |
| 9 | 51.00 | Gly | 1.53 | 2-PH | 21.72 | 0.15 | 25.50 | 0.1 | 100.00 | — |
| 10 | 50.94 | Gly | 1.53 | 2-PH | 21.81 | 0.15 | 25.47 | 0.1 | 100.00 | — |
| 11 | 47.98 | Gly | 1.44 | 2-PH | 26.35 | 0.14 | 23.99 | 0.1 | 100.00 | 0.004 (40 ppm) |
| 12 | 44.26 | Gly | 1.36 | 2-PH | 32.03 | 0.13 | 22.13 | 0.09 | 100.00 | 0.003 (30 ppm) |
| 13 | 50.87 | Gly | 1.53 | 2-PH | 22.72 | 0.14 | 24.64 | 0.1 | 100.00 | 0.004 (40 ppm) |
| 14 | 50.02 | Gly | 1.5 | 2-PH | 23.22 | 0.15 | 25.01 | 0.1 | 100.00 | 0.002 (20 ppm) |

In Table 1, the following are utilized:

The isocyanate for all of the Hybrids 1-14 is Lupranate T-80 which is commercially available from BASF Corporation.

TPP is triphenyl phosphite.

N-butyl acetate is used as Inert 2 for all except Hybrid 3 and 14. In Hybrid 3, propylene glycol monomethyl ether acetate is used as Inert 2. In Hybrid 14, t-butyl acetate is used as Inert 2.

The catalyst for all of the Examples 1-14 is MPPO which is 3-Methyl-1-phenyl-2-phospholene 1-oxide.

GP430 is Pluracol GP-430 polyol that is commercially available from BASF Corporation.

P858 is Pluracol 858 that is commercially available from BASF Corporation.

GP730 is Pluracol GP730 that is commercially available from BASF Corporation.

Gly is glycerine.

2-PH is 2-propyl heptanol.

1-Dec is 1-decanol.

Res. TDI indicates a residual amount of TDI monomer in weight percent (and parenthetically in "ppm") as determined using DIN EN ISO 10283.

A series of acid functional polymers (Polymers A-AA) are formed as described in Table 2 below. An additional series of commercially available acid functional polymers are also utilized to form films/coatings, as described below.

TABLE 2

| Poly | Iso. | Wt. % | Polyol 1 | Wt. % | Polyol 2 | Wt % | Polyol 3 | Wt % | Inert 1/ Wt % | Total |
|---|---|---|---|---|---|---|---|---|---|---|
| A | MI | 18.40 | DMPA | 4.93 | TPG | 6.69 | — | — | Diox/ 69.98 | 100.00 |
| B | MI | 16.63 | DMPA | 3.17 | 410 | 8.20 | — | — | Diox/ 72 | 100.00 |
| C | 5020 | 46.48 | DMPA | 3.52 | — | — | — | — | Diox/ 50 | 100.00 |
| D | T80 | 22.37 | DMPA | 8.63 | — | — | — | — | Diox/ 69 | 100.00 |
| E | T80 | 10.16 | DMPA | 15.67 | — | — | — | — | Diox/ 74.17 | 100.00 |
| F | T80 | 12.20 | DMPA | 18.8 | — | — | — | — | MEK/ 69 | 100.00 |
| G | M | 23.90 | DMPA | 6.4 | — | — | — | — | Diox/ 69.7 | 100.00 |
| H | MI | 24.45 | DMPA | 6.55 | — | — | — | — | Diox/ 69 | 100.00 |
| I | T80 | 16.87 | DMPA | 6.52 | GP730 | 24.57 | — | — | Diox/ 52.05 | 100.00 |
| J | T80 | 17.68 | DMPA | 6.82 | GP730 | 20.98 | — | — | Diox/ 54.52 | 100.00 |
| K | T80 | 12.41 | DMPA | 4.76 | GP730 | 9.14 | 710 | 9.14 | Diox/ 64.56 | 100.00 |
| L | T80 | 12.96 | DMPA | 4.97 | GP730 | 7.31 | 410 | 7.31 | Diox/ 67.45 | 100.00 |
| M | T 6040 | 19.44 | DMPA | 8.68 | — | — | — | — | Diox/ 71.88 | 100.00 |

TABLE 2-continued

| Poly | Iso. | Wt. % | Polyol 1 | Wt. % | Polyol 2 | Wt % | Polyol 3 | Wt % | Inert 1/ Wt % | Total |
|---|---|---|---|---|---|---|---|---|---|---|
| N | 5020 | 25.99 | DMPA | 2.01 | — | — | — | — | Diox/72 | 100.00 |
| O | 5070 | 25.35 | DMPA | 2.65 | — | — | — | — | Diox/72 | 100.00 |
| P | MP102 | 23.69 | DMPA | 4.31 | — | — | — | — | Diox/72 | 100.00 |
| Q | T80 | 14.88 | DMPA | 5.7 | TPG | 7.42 | — | — | Diox/72 | 100.00 |
| R | T80 | 28.31 | DMPA | 6.04 | 410 | 15.65 | — | — | Diox/50 | 100.00 |
| S | T80 | 31.09 | DMPA | 11.97 | 410 | 3.47 | Gly | 3.47 | Diox/50 | 100.00 |
| T | T80 | 19.14 | DMPA | 3.00 | 410 | 27.86 | — | — | Diox/50 | 100.00 |
| U | T80 | 18.38 | DMPA | 5.00 | 410 | 26.62 | — | — | Diox/50/ | 100.00 |
| V | T80 | 17.10 | DMPA | 3.00 | 410 | 29.90 | — | — | 50 | 100.00 |
| W | 180 | 5.76 | DMPA | 1.48 | 2010 | 21.38 | 2090 | 21.38 | Diox/50 | 100.00 |
| X | 180 | 10.04 | DMPA | 4.00 | 1010 | 17.98 | 2090 | 17.98 | Diox/50 | 100.00 |
| Y | T80 | 15.29 | HPE | 62.41 | — | — | — | — | BA/22.30 | 100.00 |
| Z | 180 | 9.50 | HPE | 38.77 | — | — | — | — | BA/51.73 | 100.00 |
| AA | MI | 17.33 | HPE | 24.52 | — | — | — | — | BA/58.15 | 100.00 |

In Table 2, the following are utilized:

T-80 is Lupranate T-80 that is commercially available from BASF Corporation.

MI is Lupranate MI that is commercially available from BASF Corporation.

5020 is Lupranate 5020 that is commercially available from BASF Corporation.

T6040 is commercially available from Degussa and is a mixture of IPDI and its trimer.

5070 is Lupranate 5070 that is commercially available from BASF Corporation.

MP102 is Lupranate MP102 that is commercially available from BASF Corporation.

DMPA is dimethylol propionic acid.

HPE is Laroflex HS9000 that is commercially available from BASF Corporation.

TPG is tripropylene glycol.

GP730 is Pluracol GP730 that is commercially available from BASF Corporation.

410 is Pluracol P410 that is commercially available from BASF Corporation.

2010 is Pluracol P2010 that is commercially available from BASF Corporation.

1010 is Pluracol P1010 that is commercially available from BASF Corporation.

710 is Pluracol P710 that is commercially available from BASF Corporation.

Gly is glycerine.

2090 is Pluracol 2090 that is commercially available from BASF Corporation.

BA is n-butyl acetate.

Diox. is 1,4-dioxane.

Formation of Films I-XXXIV:

After formation of the aforementioned Hybrids and Acid Functional Polymers, various hybrids are reacted with various acid functional polymers to form a series of films (i.e., Films I-XXXIII), as set forth in Table 3 below.

A comparative Benchmark Film was also formed but did not include the hybrid of this disclosure. Each of the Films is formed using a 1:1 stoichiometric equivalence of the hybrid and the acid functional polymer at 40% solids. The Benchmark Film is formed using a 1:1 stoichiometric equivalence of Desmodur L-75 and Desmophen 1300X at 40% solids.

To form Film I, Hybrid 1 is reacted with Empol 1008.
To form Film II, Hybrid 1 is reacted with Empol 1061.
To form Film III, Hybrid 1 is reacted with Empol 1012.
To form Film IV, Hybrid 1 is reacted with Empol 1043.
To form Film V, Hybrid 2 is reacted with Empol 1012.
To form Film VI, Hybrid 2 is reacted with Empol 1043.
To form Film VII, Hybrid 3 is reacted with Empol 1008.
To form Film VIII, Hybrid 3 is reacted with Empol 1061.
To form Film IX, Hybrid 3 is reacted with Empol 1012.
To form Film X, Hybrid 3 is reacted with Empol 1043.
To form Film XI, Hybrid 5 is reacted with Empol 1008.
To form Film XII, Hybrid 5 is reacted with Empol 1061.
To form Film XIII, Hybrid 5 is reacted with Empol 1012.
To form Film XIV, Hybrid 5 is reacted with Empol 1043.
To form Film XV, Hybrid 9 is reacted with Empol 1008.
To form Film XVI, Hybrid 9 is reacted with Empol 1061.
To form Film XVII, Hybrid 9 is reacted with Empol 1012.
To form Film XVIII, Hybrid 9 is reacted with Empol 1043.
To form Film XIX, Hybrid 9 is reacted with Polymer C.
To form Film XX, Hybrid 9 is reacted with HPE 206.
To form Film XXI, Hybrid 9 is reacted with Polymer B.
To form Film XXII, Hybrid 9 is reacted with Polymer A.
To form Film XXIII, Hybrid 9 is reacted with Polymer R.
To form Film XXIV, Hybrid 9 is reacted with Polymer T.
To form Film XXV, Hybrid 9 is reacted with Empol 1070.
To form Film XXVI, Hybrid 9 is reacted with Polymer U.
To form Film XXVII, Hybrid 9 is reacted with Polymer V.
To form Film XXVIII, Hybrid 9 is reacted with Polymer W.

To form Film XXIX, Hybrid 8 is reacted with Empol 1061.
To form Film XXX, Hybrid 8 is reacted with Empol 1043.
To form Film XXXI, Hybrid 8 is reacted with Polymer R.
To form Film XXXII, Hybrid 8 is reacted with Polymer T.
To form Film XXXIII, Hybrid 8 is reacted with Empol 1070.

After Formation, the Films I-XXXIII the Benchmark Film are evaluated to determine various physical properties as set forth in Table 3 below.

TABLE 3

|  | Benchmark Film | Film I | Film II | Film III | Film IV | Film V | Film VI |
|---|---|---|---|---|---|---|---|
| Appearance | 5 | 3 | 4 | 5 | 2 | 5 | 2 |
| Pot-Life | >8 h | N/A | N/A | N/A | N/A | N/A | N/A |
| Pendulum Hardness | | | | | | | |
| 1 d | 107 | 35 | 39 | 38 | 56 | 38 | 49 |
| 2 d | 107 | 35 | 44 | 46 | 63 | 39 | 54 |
| 7 d | 144 | 45 | 51 | 49 | 68 | 41 | 58 |
| 75 C. × 1 hr | 132 | 43 | 46 | 53 | 65 | 39 | 54 |
| Pencil Hardness | | | | | | | |
| 1 d | BH | B | B | B | B | B | B |
| 2 d | F | B | B | B | B | B | B |
| 7 d | F | B | B | B | B | B | B |
| 75 C. × 1 hr | H | B | BH | B | F | B | B |
| Drying Time | | | | | | | |
| T1 | 10 | 8 | 7 | 9 | 7 | 8 | 7 |
| Tack Free | 285 | 180 | 150 | 130 | 130 | 185 | 125 |
| MEK Double Rub | 262 | 48 | 16 | 15 | 91 | 10 | 68 |

|  | Film VII | Film VIII | Film IX | Film X | Film XI | Film XII | Film XIII |
|---|---|---|---|---|---|---|---|
| Appearance | 4 | 5 | 5 | 3 | 4 | 4 | 4 |
| Pot-Life | N/A | N/A | N/A | N/A | N/A | N/A | N/A |
| Pendulum Hardness | | | | | | | |
| 1 d | 34 | 40 | 39 | 60 | 40 | 51 | 41 |
| 2 d | 38 | 49 | 40 | 62 | 40 | 52 | 45 |
| 7 d | 45 | 57 | 52 | 71 | 41 | 53 | 51 |
| 75 C. × 1 hr | 39 | 49 | 41 | 69 | 42 | 52 | 49 |
| Pencil Hardness | | | | | | | |
| 1 d | B | B | B | B | B | B | B |
| 2 d | B | B | B | B | B | B | B |
| 7 d | B | B | B | B | B | B | B |
| 75 C. × 1 hr | B | B | BH | BH | B | B | B |
| Drying Time | | | | | | | |
| T1 | 10 | 9 | 10 | 10 | 14 | 16 | 20 |
| Tack Free | 300 | 210 | 230 | 180 | 220 | 216 | 230 |
| MEK Double Rub | 22 | 16 | 20 | 30 | 29 | 34 | 81 |

|  | Film XIV | Film XV | Film XVI | Film XVII | Film XVIII | Film XIX | Film XX |
|---|---|---|---|---|---|---|---|
| Appearance | 3 | 5 | 5 | 3 | 3 | 5 | 5 |
| Pot-Life | | | 5 h | 3 h | 3 h | 2 h | 2.5 h |
| Pendulum Hardness | | | | | | | |
| 1 d | 63 | 53 | 57 | 67 | 71 | 43 | 75 |
| 2 d | 65 | 75 | 80 | 83 | 95 | 47 | 82 |
| 7 d | 77 | 79 | 86 | 93 | 97 | 50 | 83 |
| 75 C. × 1 hr | 70 | 64 | 77 | 79 | 78 | 29 | 124 |
| Pencil Hardness | | | | | | | |
| 1 d | B | B | B | B | B | B | B |
| 2 d | B | B | B | B | B | B | B |
| 7 d | B | B | B | B | B | B | B |
| 75 C. × 1 hr | B | B | B | B | B | B | F |
| Drying Time | | | | | | | |
| T1 | 20 | 15 | 15 | 12 | 12 | 12 | 12 |
| Tack Free | 180 | 85 | 85 | 75 | 75 | 120 | 145 |
| MEK Double Rub | 94 | 49 | 135 | 123 | 236 | 151 | 65 |

TABLE 3-continued

|  | Film XXI | Film XXII | Film XXIII | Film XXIV | Film XXV | Film XXVI | Film XXVII |
|---|---|---|---|---|---|---|---|
| Appearance | 4 | 4 | 5 | 5 | 3 | 5 | 5 |
| Pot-Life | 2 h | 2 h | 6 h | 6 h | 2 h | 1.5 h | 5 h |
| Pendulum Hardness | | | | | | | |
| 1 d | 78 | 89 | not dry | not dry | — | — | — |
| 2 d | 101 | 103 | not dry | 72 | 84 | — | — |
| 7 d | 139 | 140 | 104 | 83 | 84 | 145 | — |
| 75 C. × 1 hr | 143 | 133 | 136 | 96 | 95 | 125 | 82 |
| Pencil Hardness | | | | | | | |
| 1 d | BH | BH | not dry | — | — | — | — |
| 2 d | F | F | not dry | B | B | — | — |
| 7 d | H | H | B | B | B | BH | B |
| 75 C. × 1 hr | F | H | F | F | B | F | B |
| Drying Time | | | | | | | |
| T1 | 10 | 10 | 18 | 75 | 26 | 15 | 30 |
| Tack Free | 140 | 165 | 2880 | 2880 | 180 | 160 | 1440 |
| MEK Double Rub | 185 | 292 | 62 | 62 | 40 | 288 | 78 |

|  | Film XXVIII | Film XXIX | Film XXX | Film XXXI | Film XXXII | Film XXXIII |
|---|---|---|---|---|---|---|
| Appearance | 5 | 5 | 3 | 5 | 5 | 5 |
| Pot-Life | 6 h | — | — | — | — | — |
| Pendulum Hardness | | | | | | |
| 1 d | not dry | 44 | 101 | not dry | — | — |
| 2 d | — | 44 | 95 | not dry | 73 | 57 |
| 7d | — | 41 | 87 | 103 | 75 | 62 |
| 75 C. × 1 hr | — | 37 | 77 | 145 | 82 | 73 |
| Pencil Hardness | | | | | | |
| 1 d | not dry | B | B | — | — | — |
| 2 d | — | B | B | — | B | B |
| 7 d | — | B | B | B | B | B |
| 75 C. × 1 hr | — | B | BH | F | B | B |
| Drying Time | | | | | | |
| T1 | not dry | 17 | 15 | 20 | 26 | 30 |
| Tack Free | — | 150 | 110 | 2880 | 180 | 180 |
| MEK Double Rub | not dry | 34 | 22 | 23 | 57 | 18 |

Pot-Life is determined using BYK-Gardner DIN 4 mm viscosity cups conform to the flow characteristics specified by Deutsche Normen DIN 53211. ASTM D1200 can also be used.

Pendulum Hardness is determined using a 100 μm wet film on glass, at 23±2 C, and at 56±5% relative humidity. The terminology 1d indicates that Pendulum Hardness was measured after 1 day at room temperature. The terminology 2d indicates that Pendulum Hardness was measured after 2 days at room temperature. The terminology 7d indicates that Pendulum Hardness was measured after 7 days at room temperature. The terminology 75 C×1 hr indicates that Pendulum Hardness was measured at 1 hour at 75 C. ASTM D4366 can also be used.

Pencil Hardness is determined using a 100 μm wet film on glass, at 23±2 C, and at 56±5% relative humidity. The terminology 1d indicates that Pencil Hardness was measured after 1 day at room temperature. The terminology 2d indicates that Pencil Hardness was measured after 2 days at room temperature. The terminology 7d indicates that Pencil Hardness was measured after 7 days at room temperature. The terminology 75 C×1 hr indicates that Pencil Hardness was measured at 1 hour at 75 C. ASTM D5402 or A7835 can also be used.

Dying Time is determined using tactile touch and evaluation. Alternatively, ASTM D 1640-03 (2009) Standard Test Method for Drying, Curing, or Film Formation of Organic Coatings at Room Temperature (Finger Touch Method) may be used. The terminology T1 indicates a time to reach surface dryness. The terminology "tack free" indicates that no tack is determined via tactile touch.

MEK Double Rub is determined using ASTM D5402 or A7835.

In addition, the Benchmark Film and other various Films that are representative of this disclosure were evaluated to determine Adhesion on Metal and Wood, Bend, Impact on Metal, and resistance to various stains. The results of these evaluations are set forth in Table 4 below.

TABLE 4

|  | Benchmark Film | Film XVI | Film XVIII | Film XXIV | Film XXI | Film XXVII |
|---|---|---|---|---|---|---|
| Mechanical Properties | | | | | | |
| Adhesion on Metal | 0 | 0 | 0 | 0 | 0 | 0 |
| Adhesion on Wood | 0 | 0 | 0 | 0 | 0 | 0 |
| Bend (cm) | 20 | 20 | 20 | 20 | 20 | 20 |
| Impact on Metal (kg * cm) | 40 | 50 | 35 | 100 | 44 | 100 |

TABLE 4-continued

| | Benchmark Film | Film XVI | Film XVIII | Film XXIV | Film XXI | Film XXVII |
|---|---|---|---|---|---|---|
| Stain Resistance | | | | | | |
| Coffee (1 h) | 5 | 5 | 5 | 5 | 5 | 5 |
| Tea (1 h) | 5 | 5 | 5 | 5 | 5 | 5 |
| Vinegar (1 h) | 5 | 5 | 5 | 5 | 5 | 5 |
| Mustard (16 h) | 5 | 5 | 5 | 3 | 5 | 4 |
| Water (24 h) | 5 | 5 | 5 | 5 | 5 | 5 |
| Alkali (2 h) | 5 | 5 | 5 | 5 | 5 | 5 |
| Ethanol 50% (8 h) | 5 | 5 | 5 | 5 | 5 | 5 |
| Chemical Resistance | | | | | | |
| BA/EA = 1:1 1 min/5 min | 5/5 | 4/4 | 5/4 | 4/3 | 5/5 | 5/3 |

Generally in Table 4, a score of 5 is the best while a score of 1 is the worst. However, relative to Adhesion, a score of 1 is the worst and a score of 0 is the best.

"BA/EA" is indicative of a mixture of butyl acetate/ethyl acetate that was used to assess chemical resistance of the various Films.

Adhesion is determined using ASTM D3359.
Bend is determined using ASTM D522.
Impact is determined using ASTM D6905-03.
Stain Resistance is determined using ASTM D1308-02.

The data set forth above demonstrates that the coatings/films are environmentally friendly and exhibit extremely low amounts of toluene diisocyanate, which is also the focus of newer EPA regulations. This data also demonstrates that improved film performance properties can be generated relative to dry time, stain resistance, and various mechanical properties.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by −5%, −10%, −15%, −20%, −25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A solvent-borne system for forming an n-acyl urea coating on a substrate, said solvent-borne system comprising:
  A. a polycarbodiimide-polyurethane hybrid having the structure:

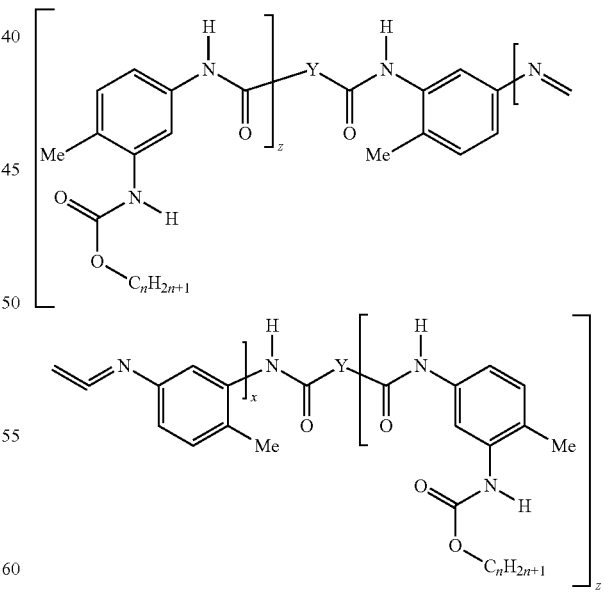

wherein each n is independently a number from 1 to 20; wherein each Y is independently an alkoxy or polyalkoxy group having (w) oxygen atoms, wherein each w is independently at least 1; wherein each z is independently a number from 0 to (w−1); and wherein x, a number of Y, and a total number of said $C_nH_{2n+1}$ groups are present in a ratio of from (4 to 5):(0.5 to 1.5):(2.5 to 4.5), respectively, B. an acid functional polymer; and C. an organic solvent, wherein said solvent-borne system comprises less than or equal to 10 weight percent of water based on a total weight of said solvent-borne system, and wherein said solvent-borne system includes less than about 100 parts by weight of toluene diisocyanate per one million parts by weight of said solvent-borne system.

2. The solvent-borne system of claim 1 wherein each Y is independently derived from a tri-hydroxy functional polyol having a hydroxyl number from 1500 to 2000 mg KOH/g or each Y is independently derived from a tri-hydroxy functional polyol having a hydroxyl number from 800 to 1200 mg KOH/g, or each Y is independently derived from a tri-hydroxy functional polyol having a hydroxyl number from 20 to 400 mg KOH/g.

3. The solvent-borne system of claim 1 wherein each Y is derived from glycerine.

4. The solvent-borne system of claim 1 wherein each Y is independently derived from a diol chosen from propylene glycol, ethylene glycol, copolymers thereof, and combinations thereof.

5. The solvent-borne system of claim 1 wherein each Y is independently derived from a monol.

6. The solvent-borne system of claim 5 wherein said monol is chosen from 1-decanol, 2-propyl-1-heptanol, 2-ethyl-hexanol, n-butanol, pentanol, and combinations thereof.

7. The solvent-borne system of claim 1 wherein each n is independently from 1 to 20, and wherein each w is 3 and each z is 2 or wherein w is 2 and each z is 1.

8. The solvent-borne system of claim 1 wherein x, the number of Y, and the total number of said $C_nH_{2n+1}$ groups are present in a ratio of from (4.5 to 5):(0.95 to 1.05):(3.3 to 3.7), respectively.

9. The solvent-borne system of claim 1 wherein said acid functional polymer is further defined as an organic mono, di, and/or poly-acid having the formula $HO(O)CR[C(O)OH]_m$ wherein R is an alkyl group having from 1 to 36 carbon atoms and m is from 0 to 3.

10. The solvent-borne system of claim 1 wherein said acid functional polymer is further defined as a polymer of a dimer acid.

11. The solvent-borne system of claim 1 wherein said acid functional polymer is further defined as an acid functional copolymer of styrene and/or alpha-methylstyrene and an acrylate or methacrylate and/or 2-ethylhexylacrylate.

12. The solvent-borne system of claim 1 wherein said acid functional polymer is further defined as an acid functional polyurethane.

13. The solvent-borne system of claim 12 wherein said acid functional polyurethane has the formula $OCNR'NHCOOCH_2C(CH_3)(COOH)CH_2OCONHR'NCO$, wherein R' is a TDI, MDI, HDI, IPDI, NDI, or TMXDI residue, or wherein said acid functional polyurethane is a prepolymer of TDI, MDI, HDI, IPDI, NDI, or TMXDI.

14. The solvent-borne system of claim 1 wherein said acid functional polymer is further defined as an acid functional polyester.

15. The solvent-borne system of claim 14 wherein said acid functional polyester is chosen from (1) a polymer of styrene, maleic anhydride, and an alcohol, (2) a polymer of caprolactone and dimethylolpropionic acid, and combinations thereof.

16. The solvent-borne system of claim 1 wherein said polycarbodiimide-polyurethane hybrid is present in an amount of from 5 to 80 parts by weight per 100 parts by weight of said solvent-borne system and/or said acid functional polymer is present in an amount of from 5 to 80 parts by weight per 100 parts by weight of said solvent-borne system.

17. The solvent-borne system of claim 1 having a pot life of from 0.5 to 12 hours as determined using ASTM D1200.

18. A method of forming the solvent-borne system of claim 1 comprising the steps of providing the polycarbodiimide-polyurethane hybrid, providing the acid functional polymer, providing the organic solvent, and combining the polycarbodiimide-polyurethane hybrid, the acid functional polymer, and the organic solvent to form the solvent-borne system.

19. An n-acyl urea coating formed from the solvent-borne system of claim 1 comprising the reaction product of the polycarbodiimide-polyurethane hybrid and the acid functional polymer.

20. A method of forming the n-acyl urea coating of claim 19 comprising the steps of providing the polycarbodiimide-polyurethane hybrid, providing the acid functional polymer, providing the organic solvent, combining the polycarbodiimide-polyurethane hybrid, the acid functional polymer, and the organic solvent to form a solvent-borne system, and reacting the polycarbodiimide-polyurethane hybrid and the acid functional polymer in the presence of the organic solvent to form the n-acyl urea coating.

21. An article comprising a substrate and the n-acyl urea coating of claim 19 disposed on said substrate.

* * * * *